United States Patent
Kaule et al.

(10) Patent No.: US 6,383,618 B1
(45) Date of Patent: May 7, 2002

(54) PRINTED DOCUMENT COMPRISING A LUMINESCENT AUTHENTICITY FEATURE

(76) Inventors: Wittich Kaule, Lindacher Weg 13, D-82275, Emmering; Gerhard Schwenk, Primelstrasse 106, D-82178, Puchheim; Gerhard Stenzel, Fichtenstrasse 88, D-82110, Germering, all of (DE)

( * ) Notice: Subject to any disclaimer, the term of this patent is extended or adjusted under 35 U.S.C. 154(b) by 0 days.

(21) Appl. No.: 09/381,643

(22) PCT Filed: Jan. 29, 1999

(86) PCT No.: PCT/EP99/00596
§ 371 Date: Jan. 24, 2000
§ 102(e) Date: Jan. 24, 2000

(87) PCT Pub. No.: WO99/38703
PCT Pub. Date: Aug. 5, 1999

(30) Foreign Application Priority Data

Feb. 2, 1998 (DE) .......................... 198 03 997

(51) Int. Cl.[7] .............. B32B 29/00; B32B 3/00
(52) U.S. Cl. ............ 428/211; 428/67; 428/199; 428/916; 283/74; 283/901; 252/301.4 R
(58) Field of Search .................. 428/67, 199, 203, 428/204, 207, 211, 333, 403, 464, 537.5, 696, 913, 916; 283/74, 57, 904, 901, 113, 114, 107; 427/7, 57; 252/301.4 R

(56) References Cited

U.S. PATENT DOCUMENTS

| | | | | | |
|---|---|---|---|---|---|
| 4,183,989 | A | * | 1/1980 | Tooth | 428/195 |
| 4,451,521 | A | | 5/1984 | Kaule et al. | |
| 4,452,843 | A | | 6/1984 | Kaule et al. | |
| 4,598,205 | A | | 7/1986 | Kaule et al. | |
| 5,005,873 | A | * | 4/1991 | West | 283/92 |
| 5,599,578 | A | * | 2/1997 | Butland | 427/7 |
| 5,651,615 | A | * | 7/1997 | Hurier | 283/92 |

FOREIGN PATENT DOCUMENTS

DE      27 45 301      4/1979

OTHER PUBLICATIONS

Grant and Hackh's Chemical Dictionary, Roger Grant and Claire Grant, McGraw–Hill Book Company, 5th edition, p. 13.*

* cited by examiner

Primary Examiner—Deborah Jones
Assistant Examiner—Gwendolyn Blackwell-Rudasill

(57) ABSTRACT

The invention concerns a printed valuable document with at least one authentication mark in the form of a luminescent substance based on a host lattice doped with at least one rare earth metal. The host lattice largely absorbs light in the entire visible region of the spectrum, is excitable in substantial parts of the visible region of the spectrum, and is at least partially transparent at least in the wavelength range between 0.8 $\mu$m and 1.1 $\mu$m. The host lattice also features a garnet or perovskite structure. The rare earth metal emits light in the wavelength range between 0.8 $\mu$m and 1.1 $\mu$m.

25 Claims, 3 Drawing Sheets

PRINTED DOCUMENT COMPRISING A LUMINESCENT AUTHENTICITY FEATURE

Figure 1:
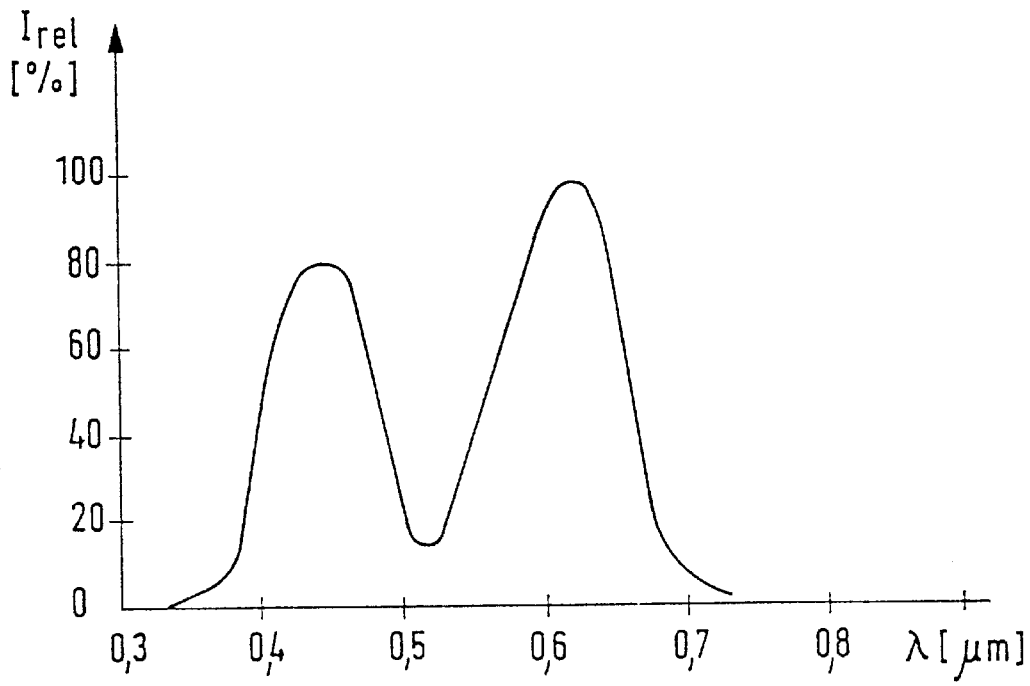

The invention concerns a printed valuable document with at least one authentication mark in the form of a luminescent substance based on a host lattice doped with at least one rare earth metal.

The protection of valuable documents by means of luminescent substances has been known for a long time. The use of rare earth metals in this connection has also been discussed. These have the advantage of possessing, in the infra-red spectral region, narrow-band emission lines, which are particularly characteristic, and can therefore be safely distinguished from the emissions of other substances when using measuring technology. In order to increase protection against counterfeiting still further, the rare earth metals can be incorporated together with other substances in host lattices, with the result that the excitation and/or emission spectrum of the rare earth metal is influenced in a characteristic manner. By combination with suitably absorptive substances, for example, a part of the excitation and/or emission bands of the rare earth metal can be suppressed. This influence can, however, also take the form of a "distortion", e.g. through damping of specific regions of broad-band spectra.

Likewise for reasons of protection against counterfeiting, rare earth metals with emission lines above 1500 nm are frequently used, since detection of the emission becomes more elaborate and more difficult the further into the IR spectral region the emission lines lie. For in very general terms, the principle applies that the detection sensitivity of photodetectors decreases the longer the wavelength of the radiation to be measured, since the signal-to-noise ratio becomes smaller in the same proportion; i.e. the signals to be detected are more and more difficult to identify in the noise. The luminescent substances must therefore also be present in the valuable document in a certain minimum concentration, in order to be able to produce an adequate signal strength, which can be reliably detected in the noise. In certain instances, however, these limit concentrations necessary for detection cannot be produced; for example, if the luminescent substances have their own colour, which destroys the desired colour impression when mixed with the material of the valuable document. In some cases, the attempt is also made to reduce the risk of detection by chemical analysis of the luminescent substances contained in a valuable document by the fact that the luminescent substances are applied only in very small concentrations.

In such cases, luminescent substances must be used for which the emission lines can be readily detected even in small concentrations.

The invention is therefore based on the aim of providing a valuable document with a luminescent substance producing emissions in the near IR spectral region so that, even at low concentrations, the presence of the luminescent substance can be demonstrated in the valuable document.

The fulfilment of this objective is provided by the non-dependent claims. Further developments are the subject of the dependent claims.

The valuable document according to the invention contains at least one luminescent substance based on host lattices doped with rare earth metal, such that the rear earth metal emits in the near IR spectral region, i.e. in the wavelength range of between 0.8 $\mu$m and 1.1 $\mu$m. This emission range has the advantage that its existence can be readily detected with a silicon (Si), gallium arsenide (GaAs), gallium-indium-arsenide ($Ga_xIn_{x-1}As$) or germanium (Ge) photodetector, since these have a relatively high response sensitivity in this wavelength region. As optically active rare earth metals, consideration may be given to the elements ytterbium, neodymium, or praseodymium, or mixtures of these elements with one or more other rare earth metals.

These rare earth metals are embedded in a host lattice, which has effective excitation bands in the visible region of the spectrum, and transfers these excitation bands to the rare earth metals. The effective excitation bands can be realised by, for example, chromium structural elements which, according to the invention, are incorporated in a garnet or perovskite structure.

In this situation, the host lattice possesses an optical window in the near infrared spectral region, and absorbs in virtually the entire visible region of the spectrum, so that all the lines in the visible spectral region of the luminescent substance are suppressed. The excitation range of the luminescent substances overlaps the radiation range of strong light sources, such as halogen lamps, flash lamps, and similar sources. As a result of this, and due to the effective energy transfer to the rare earth metals within the host lattice, it is possible to use very small quantities of substance with the valuable documents according to the invention, without the automatic detection capability being restricted. Detection by means of chemical analysis, however, is rendered extremely difficult due to the low concentration.

The absorptive constituents of the host lattice may in part be replaced by non-absorptive aluminium. The absorption, and therefore the brightness of the luminescent substance, can be controlled through the proportion of aluminium. Luminescent substances of this type can therefore also be used as additives for lighter printing inks.

Figure 2:
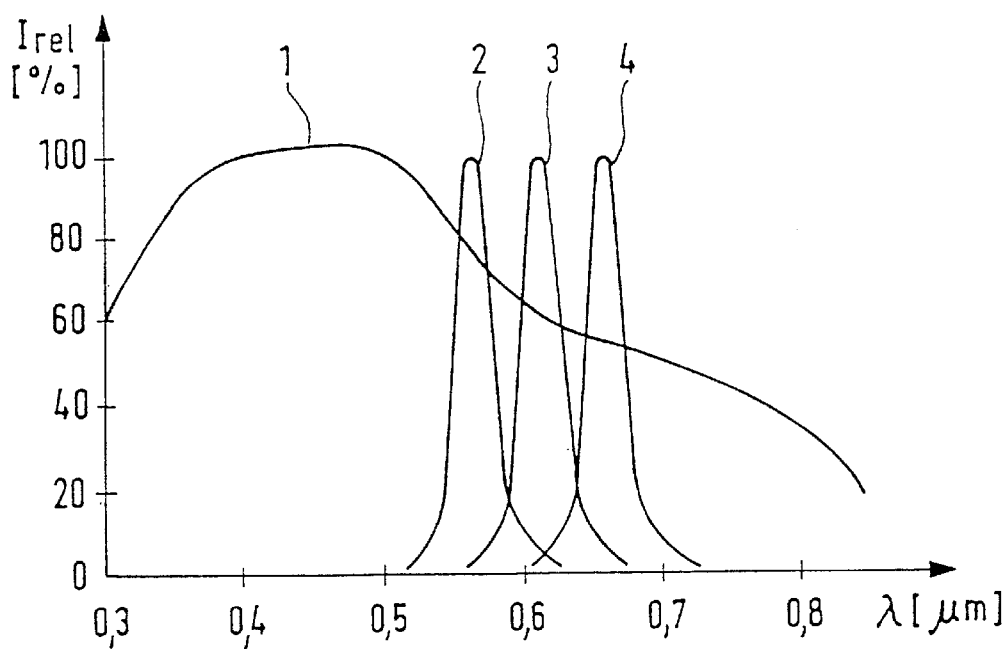
Figure 3:
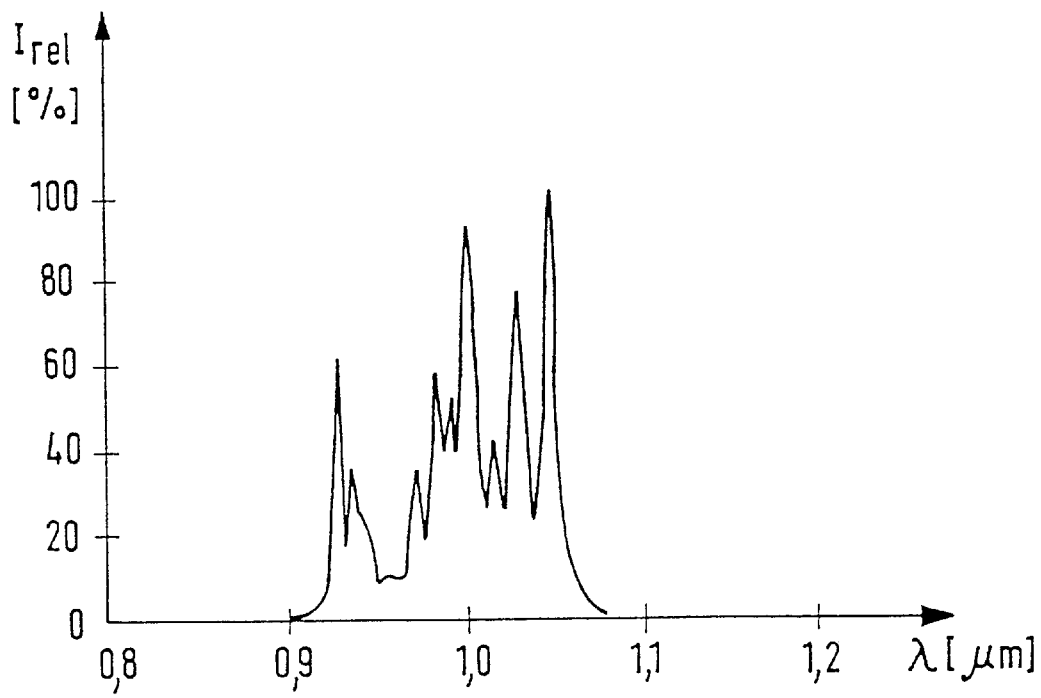
Figure 4:
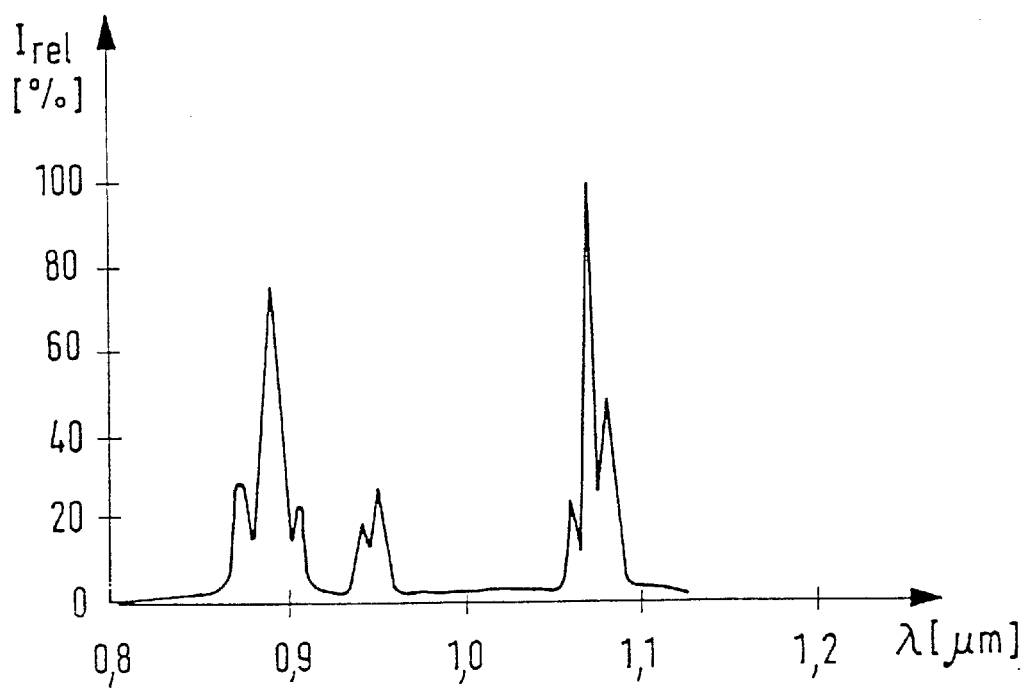
Figure 5:
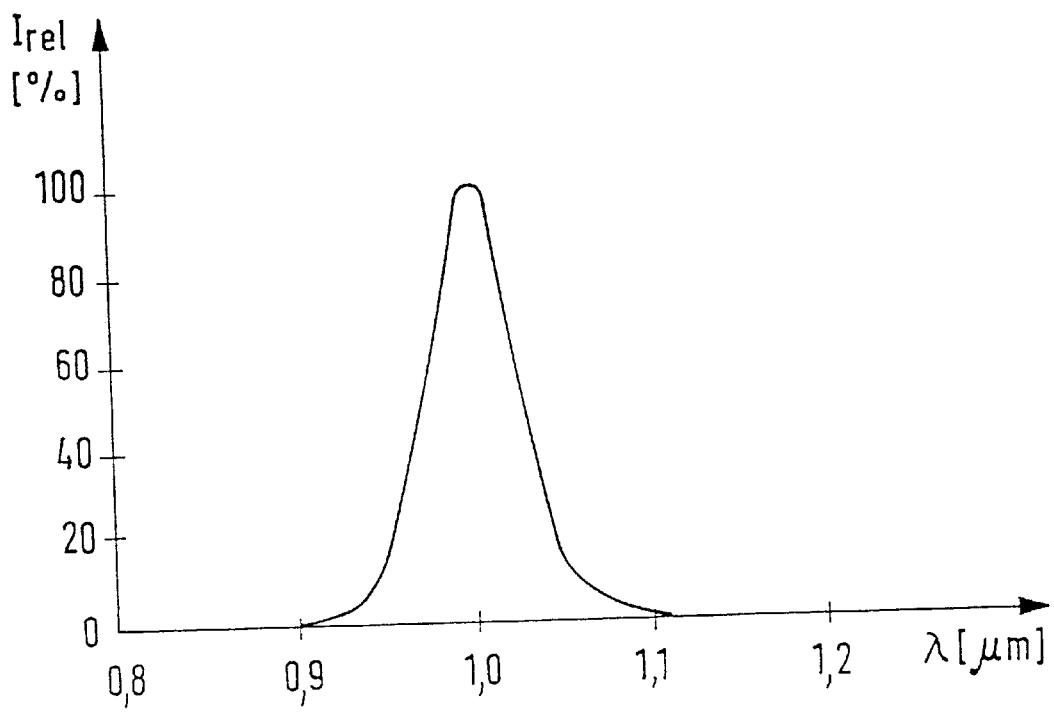
Figure 6:
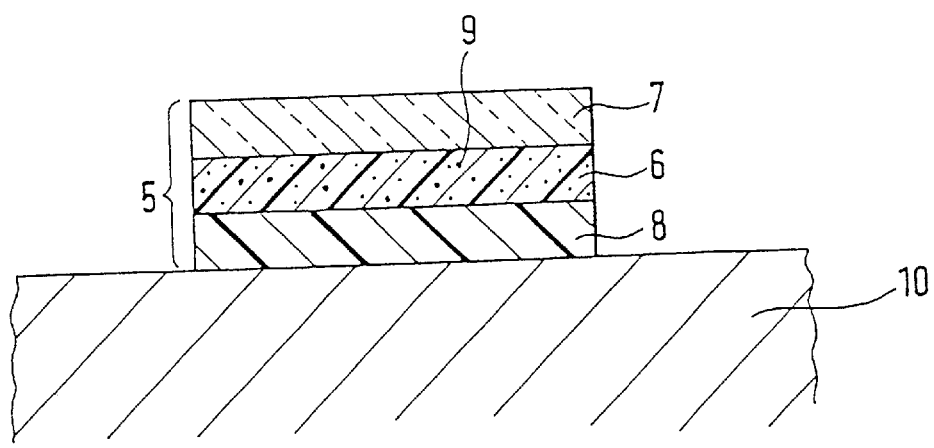

Further embodiments and advantages of the invention are explained hereinafter on the basis of the diagrams and the examples:

FIG. 1 Excitation spectrum of a chromium-containing lattice according to the invention FIG. 2 Spectra of several light sources FIG. 3 Emission spectrum of a luminescent substance according to the invention, doped with Pr FIG. 4 Emission spectrum of a luminescent substance according to the invention, doped with Nd FIG. 5 Emission spectrum of a luminescent substance according to the invention, doped with Yb FIG. 6 Security element according to the invention, in a cross-sectional view.

FIG. 1 shows the excitation spectrum of a chromium-containing lattice according to the invention. This lattice absorbs in almost the entire visible spectral region. Due to this very broad-band absorption of the host lattice, the lines produced in this region by the rare earth metal dopings are suppressed. At the same time, an energy transfer from the lattice to the rare earth doping takes place, thereby inducing the emission by the luminescent substance.

The broadband absorption of the lattice also has the advantage that strong light sources can be used for the excitation of the luminescent substances, such as flash lamps, which likewise emit radiation in the entire visible region of the spectrum.

FIG. 2 shows the spectrum of such a flash lamp with the reference character 1. The spectrum 1 of the flash lamp shown extends continuously from the UV spectral region into the IR region. In some cases, it may also be a good idea to illuminate the luminescent substance only with light from the visible spectrum range. In this case, illumination with light-emitting diodes offers the appropriate wavelength. Light-emitting diodes feature in general a narrow-band spectrum so that, to cover the entire spectral range, several LEDs are required. FIG. 2 shows the spectra 2, 3, 4 of a green, orange, and red light-emitting diode.

FIGS. 3, 4 and 5 show the emission spectra of individual luminescent substances according to the invention.

FIG. 3 shows the emission spectrum of a host lattice doped with Pr. The spectrum extends from about 0.9 μm to about 1.08 μm. It features a very characteristic number of emission peaks, which can be assessed very satisfactorily as authentication features.

FIG. 4 shows the characteristic spectrum of a lattice doped with Nd. This spectrum features two relatively strong emission peaks in the range from about 0.9 μm to just under 1.1 μm. A somewhat smaller peak is additionally located in the region of 0.95 μm.

The spectrum shown in FIG. 5 of a Yb-doped lattice is, by contrast, very symmetrical and shows only one peak, the maximum of which is at 1.0 μm.

All these lattices according to the invention have the factor in common that they show a very striking luminescence emission in the near infrared region, i.e. in the range between 0.8 μm and 1.1 μm, which is difficult to identify. Although all three emission spectra are arranged in the same spectral region, they differ from one another so unambiguously that differentiation with measuring equipment is readily possible.

In order to guarantee the highest possible effectiveness of the rare earth metals, in the case of a garnet structure, host lattices are used with the general formula:

$$A_3Cr_{5-x}Al_xO_{12}$$

where A stands for an element from the group of scandium, yttrium, the lanthanides, and the actinides, and the index x fulfils the condition 0<x<4.99. Preferably, the index x moves in the range between 0.3 and 2.5.

A preferred embodiment of the luminescent substance according to the invention is:

$$Y_{3-z}D_zCr_{5-x}Al_xO_{12}$$

where D stands for neodymium, praseodymium, or ytterbium, and the index z fulfils the condition 0<z<1.

If the host lattice has a perovskite structure, it can be described by the general formula:

$$ACrO_3$$

where A stands for an element from the group of yttrium, scandium, and the lanthanides.

A preferred embodiment of the luminescence substance according to the invention is a perovskite structure can be described by the following formula:

$$Y_{1-z}D_zCrO_3$$

where D stands for one of the elements neodymium, praseodymium, or ytterbium, and the index z fulfils the condition 0<z<1.

A number of examples of the luminescent substances according to the invention are explained in greater detail below.

EXAMPLE 1

Manufacture of neodymium-activated yttrium-aluminium-chromium mixed garnet $(Y_{2.95}Nd_{0.05}Cr_4Al_1O_{12})$:

47.82 g yttrium oxide ($Y_2O_3$), 7.32 g aluminium oxide ($Al_2O_3$), 43.65 g chromium (III) oxide ($Cr_2O_3$), 1.21 g neodymium oxide ($Nd_2O_3$), and 100 g dehydrated sodium sulphate ($Na_2SO_4$) are mixed intimately and heated to 1100° C. in a corundum crucible for 12 hours.

After cooling, the reaction product is ground, the fluxing agent is washed out with water, the sodium chromate produced as a side-product is reduced with sulphuric acid/iron (II) sulphate to chromium (III) sulphate, and then dried in air at 100° C. To achieve the finest possible grain size, the powder is then ground in a stirring ball mill in water until an average grain size of less than 1 μm results.

After filtration and drying, a green powder is obtained.

EXAMPLE 2

Manufacture of ytterbium-activated yttrium-aluminium-chromium mixed garnet $(Y_{2.7}Yb_{0.3}Cr_3Al_2O_{12})$:

43.93 g of yttrium oxide ($Y_2O_3$), 14.69 g aluminium oxide ($Al_2O_3$), 32.86 g chromium (III) oxide ($Cr_2O_3$), 8.52 g ytterbium oxide ($Yb_2O_3$) and 100 g dehydrated sodium sulphate ($Na_2SO_4$) are intimately mixed and heated to 1100° C. in a corundum crucible for 12 hours.

After cooling, the reaction product is ground, the fluxing agent is washed out with water, the sodium chromate produced as a side-product is reduced with sulphuric acid/iron (II) sulphate to chromium (III) sulphate, and dried in air at 100° C. To achieve the finest possible grain size, the powder is then ground accordingly in water in a stirring ball mill.

After filtering and drying a green powder is obtained, with an average grain size of less than 1 μm.

EXAMPLE 3

Manufacture of praseodymium-activated yttrium-aluminium-chromium mixed garnet $(Y_{2.98}Pr_{0.02}Cr_{2.4}Al_{2.6}O_{12})$:

51.39 g yttrium oxide ($Y_2O_3$), 20.24 g aluminium oxide ($Al_2O_3$), 27.86 g chromium (III) oxide ($Cr_2O_3$), 0.5 g praseodymium oxide ($Pr_2O_3$) and 100 g dehydrated sodium sulphate ($Na_2SO_4$) are intimately mixed and heated to 1100° C. in a corundum crucible for 12 hours.

After cooling, the reaction product is ground, the fluxing agent is washed out with water, the sodium chromate produced as a side-product is reduced with sulphuric acid/iron (II) sulphate to chromium (III) sulphate, and dried in air at 100° C. To achieve the finest possible grain size, the powder is then ground accordingly in water in a grinding ball mill.

After filtration and drying, a light green powder is obtained, with an average grain size of less than 1 μm.

EXAMPLE 4

Manufacture of neodymium-activated yttrium-chromium-perovskite $(Y_{0.95}Nd_{0.05}CrO_3)$:

55.96 yttrium oxide ($Y_2O_3$), 39.65 g chromium oxide ($Cr_2O_3$), 4.39 neodymium oxide ($Nd_2O_3$) and 100 g dehydrated sodium sulphate ($Na_2SO_4$) are intimately mixed and heated to 1100° C. in a corundum crucible for 20 hours.

After cooling, the reaction product is ground, the fluxing agent is washed out with water, the sodium chromate produced as a side-product is reduced with sulphuric acid/iron (II) sulphate to chromium (III) sulphate, and dried in air at 100° C. To achieve the finest possible grain size, the powder is ground accordingly in water in a grinding ball mill.

After filtration and drying, a light green powder is obtained, with an average grain size of less than 1 μm.

The luminescent substances can, according to the invention, be introduced to the valuable document in a variety of different ways. For example, the luminescent substances can be mixed into a printing ink, which additionally contains visible colour additives. Mixing of the luminescent substances into a paper clip is also possible. Likewise, the luminescent substances can be applied on or in a plastic substrate material, which, for example, is at least partially embedded in a paper pulp. The substrate material may in this case take the form of a safety thread, a mottling thread, or a planchet.

The plastic or paper substrate material can, however, also be attached to any other desired object, for example, for product security. In this case, the substrate material is preferably made in the form of a label. If the substrate material is a constituent part of the object which is to be secured, as is the case, for example, with tear-off threads, any other shape is naturally also possible. In specific application instances it may be a good idea for the luminescent substance to be provided as an invisible coating on the valuable document. It may then be present over the entire surface, or in the form of specific patterns, such as strips, lines, circles, or in the form of alphanumeric symbols.

The designation "valuable document" is to be understood in the context of the invention to mean items such as bank notes, cheques, shares, stamps, identity cards, credit cards, passes, and other documents, as well as labels, seals, packaging, or other elements for product security.

FIG. 6 shows an embodiment of a security element according to the invention. The security element consists in this case of a label 5, which is composed of a paper or plastic layer 6, a transparent covering layer 7, and an adhesive layer 8. This label 5 is attached to the desired substrate 10 by means of the adhesive layer 8. This substrate 10 may be a valuable document, identity card, pass, certificate, or similar item, or other document to be safeguard, such as CDs, packaging, etc.

The luminescent substance 9 in this embodiment is contained in the volume of the layer 6. If this layer 6 is a paper layer, then the concentration of luminescent substance is between 0.05 and 1% by weight.

As an alternative, the luminescent substance may also be contained in a printing ink, not shown, which is printed on one of the layers of the label, preferably on the surface of the layer 6. The concentration of luminescent substance in the printing ink varies in this case in the range between 10 and 30% by weight.

Instead of the luminescent substance being present in or on a substrate material, which is then attached as a security element to an object, it is also possible according to the invention for the luminescent substance to be provided directly in the valuable document to be safeguarded, or onto its surface, in the form of a coating.

What is claimed is:

1. Printed valuable document, with at least one authentication mark in the form of a luminescent substance based on a host lattice doped with at least one rare earth metal, which largely absorbs light in the entire visible region of the spectrum, is excitable in substantial parts of the visible region of the spectrum and is at least partially transparent at least in the wavelength range between 0.8 and 1.1 μm, whereby the at least one rare earth metal emits in the wavelength range between 0.8 μm and 1.1 μm, and that the host lattice has a garnet or perovskite structure.

2. Printed valuable document according to claim 1, wherein the rare earth metal is ytterbium, praseodymium, or neodymium.

3. Printed valuable document according to claim 1, wherein the host lattice contains chromium as an absorptive component.

4. Printed valuable document according to claim 1, wherein the garnet structure can be described by the general formula $$A_3Cr_{5-x}Al_xO_{12}$$

where A stands for an element selected from the group consisting of scandium, yttrium, the lanthanides, and the actinides, and the index x fulfils the condition 0<x<4.99.

5. Printed valuable document according to claim 4, wherein the index x fulfils the condition 0.3<x<2.5.

6. Printed valuable document according to claim 4, wherein the luminescent substance can be described by the formula $$Y_{3-z}D_zCr_{5-x}Al_xO_{12}$$

where D stands for an element selected from the group consisting of neodymium, praseodymium, and ytterbium, and the index z fulfils the condition 0<z<1.

7. Printed valuable document according to claim 1, wherein the perovskite structure can be described by the general formula $$ACrO_3$$

where A stands for an element selected from the group consisting of yttrium, scandium, and the lanthanides.

8. Printed valuable document according to claim 7, wherein the luminescent substance can be described according to the formula $$Y_{1-z}D_zCrO_3$$

where D stands for an element selected from the group consisting of neodymium, praseodymium, and ytterbium, and the index z fulfils the condition 0<z<1.

9. Printed valuable document according to claim 1, wherein the luminescent substance is mixed into a printing ink, which additionally contains visible color additives.

10. Printed valuable document according to claim 1, wherein the luminescent substance is mixed into the paper pulp.

11. Printed valuable document according to claim 1, wherein the luminescent substance is provided on or in a substrate material, which is at least partially embedded in the paper pulp.

12. Printed valuable document according to claim 11, wherein the substrate material consists of plastic.

13. Printed valuable document according to claim 11, wherein the substrate material is a security thread or mottling fiber.

14. Printed valuable document according to claim 1, wherein the luminescent substance is provided as an invisible and at least partial coating on the valuable document.

15. Printed valuable document according to claim 14, wherein the coating is a stripe.

16. Security element, which features at least one substrate material and one luminescent substance based on a host lattice doped with at least one rare earth metal, which largely absorbs light in the visible spectral region, is excitable in substantial parts of the visible spectral region, and is at least partially transparent at least in the wavelength range between 0.8 μm and 1.1 μm, whereby the at least one rare earth metal emits light in the wavelength range between 0.8 μm and 1.1 I μm, and the host lattice has a garnet or perovskite structure.

17. Security element according to claim 16, wherein the luminescent substance is provided in the volume of the substrate material.

18. Security element according to claim 17, wherein the luminescent substance is present in the substrate material in a concentration between 0.01 and 10% by weight.

19. Security element according to claim 16, wherein the luminescent substance is present in a layer applied to the substrate material.

20. Security element according to claim 19, wherein the luminescent substance is present in a printing ink in a concentration between 0.5 and 40% by weight.

21. Security element according to claim 16, wherein the substrate material consists of plastic.

22. Security element according to claim 16, wherein the substrate material consists of paper.

23. Security element according to claim 16, wherein the substrate material is a security thread, mottling fiber, planchet, or label.

24. Security element according to claim 17, wherein the luminescent substance is present in the substrate material in a concentration between 0.1 and 5% by weight.

25. Security element according to claim 19, wherein the luminescent substance is present in a printing ink in a concentration between 20 and 30% by weight.

* * * * *